United States Patent
Reid et al.

(10) Patent No.: US 8,352,891 B2
(45) Date of Patent: Jan. 8, 2013

(54) LAYOUT DECOMPOSITION BASED ON PARTIAL INTENSITY DISTRIBUTION

(75) Inventors: Christopher E Reid, Tigard, OR (US); George P Lippincott, Lake Oswego, OR (US); Sergiy M Komirenko, Cupertino, CA (US)

(73) Assignee: Mentor Graphics Corporation, Wilsonville, OR (US)

( * ) Notice: Subject to any disclaimer, the term of this patent is extended or adjusted under 35 U.S.C. 154(b) by 101 days.

(21) Appl. No.: 12/859,743

(22) Filed: Aug. 19, 2010

(65) Prior Publication Data
US 2012/0047473 A1    Feb. 23, 2012

(51) Int. Cl.
*G06F 17/50* (2006.01)
*G06F 19/00* (2006.01)
*G03F 1/00* (2006.01)
*G21K 5/00* (2006.01)

(52) U.S. Cl. ........... 716/55; 716/52; 716/53; 716/54; 716/106; 716/111; 700/98; 700/121; 430/5; 378/35

(58) Field of Classification Search ............ 716/52, 716/53, 54, 55, 106, 111; 700/98, 121; 430/5; 378/35
See application file for complete search history.

(56) References Cited

U.S. PATENT DOCUMENTS

| | | | |
|---|---|---|---|
| 2008/0024873 A1* | 1/2008 | Kim et al. | 359/642 |
| 2009/0319970 A1* | 12/2009 | Park | 716/5 |
| 2010/0215273 A1* | 8/2010 | Aksenov et al. | 382/190 |

OTHER PUBLICATIONS

Resolution Enhancement Technology: The Past, the Present, and Extensions for the Future, Frank M. Schellenberg, Optical Microlithography XVII, edited by Bruce W. Smith, Proceedings of SPIE vol. 5377.
"Model Assisted Double Dipole Decomposition," J.A. Torres, et. al., Optical Microlithography XV, Proceedings of SPIE vol. 4691.

* cited by examiner

*Primary Examiner* — Phallaka Kik (57) ABSTRACT

Layout design data are decomposed for double dipole lithography based on partial intensity distribution information. The partial intensity distribution information is generated by performing optical simulations on the layout design data. The layout decomposition may further be adjusted during an optical proximity correction process. The adjustment may utilize the partial intensity distribution information.

24 Claims, 8 Drawing Sheets

LAYOUT DECOMPOSITION BASED ON PARTIAL INTENSITY DISTRIBUTION

FIELD OF THE INVENTION

The present invention is directed to resolution enhancement techniques for photolithography.

BACKGROUND OF THE INVENTION

Electronic circuits, such as integrated circuits (ICs), are used in a variety of products, from automobiles to microwaves to personal computers. Designing and fabricating IC devices typically involves many steps, sometimes referred to as the "design flow." The particular steps of a design flow often are dependent upon the type of the circuit, its complexity, the design team, and the circuit fabricator or foundry that will manufacture the circuit. Typically, software and hardware "tools" verify the design at various stages of the design flow by running software simulators and/or hardware emulators. These steps aid in the discovery of errors in the design, and allow the designers and engineers to correct or otherwise improve the design.

Several steps are common to most design flows. Initially, the specification for a new circuit is transformed into a logical design, sometimes referred to as a register transfer level (RTL) description of the circuit. With this logical design, the circuit is described in terms of both the exchange of signals between hardware registers and the logical operations that are performed on those signals. The logical design typically employs a Hardware Design Language (HDL), such as the Very high speed integrated circuit Hardware Design Language (VHDL). The logic of the circuit is then analyzed, to confirm that it will accurately perform the functions desired for the circuit. This analysis is sometimes referred to as "functional verification."

After the accuracy of the logical design is confirmed, it is converted into a device design by synthesis software. The device design, which is typically in the form of a schematic or netlist, describes the specific electronic devices (such as transistors, resistors, and capacitors) that will be used in the circuit, along with their interconnections. This device design generally corresponds to the level of representation displayed in conventional circuit diagrams. The relationships between the electronic devices are then analyzed, to confirm that the circuit described by the device design will correctly perform the desired functions. This analysis is sometimes referred to as "formal verification." Additionally, preliminary timing estimates for portions of the circuit are often made at this stage, using an assumed characteristic speed for each device, and incorporated into the verification process.

Once the components and their interconnections are established, the design is again transformed, this time into a physical design that describes specific geometric elements. This type of design often is referred to as a "layout" design. The geometric elements, which typically are polygons, define the shapes that will be created in various layers of material to manufacture the circuit. Typically, a designer will select groups of geometric elements representing IC components (e.g., contacts, channels, gates, etc.) and place them in a design area. These groups of geometric elements may be custom designed, selected from a library of previously-created designs, or some combination of both. Lines are then routed between the geometric elements, which will form the wiring used to interconnect the electronic devices. Layout tools (often referred to as "place and route" tools), such as Mentor Graphics' IC Station or Cadence's Virtuoso, are commonly used for both of these tasks.

Circuit layout descriptions can be provided in many different formats. The Graphic Data System II (GDSII) format is a popular format for transferring and archiving two-dimensional (2D) graphical circuit layout data. Among other features, it contains a hierarchy of structures, each structure containing layout elements (e.g., polygons, paths or polylines, circles and textboxes). Other formats include an open source format named Open Access, Milkyway by Synopsys, Inc., EDDM by Mentor Graphics, Inc., and the more recent Open Artwork System Interchange Standard (OASIS) proposed by Semiconductor Equipment and Materials International (SEMI). These various industry formats are used to define the geometrical information in layout designs that are employed to manufacture integrated circuits. Once the design is finalized, the layout portion of the design can be used by fabrication tools to manufacture the circuit using a photolithographic process.

There are many different fabrication processes for manufacturing a circuit, but most processes include a series of steps that deposit layers of different materials on a substrate, expose specific portions of each layer to radiation, and then etch the exposed (or non-exposed) portions of the layer away. For example, a simple semiconductor device component could be manufactured by the following steps. First, a positive type epitaxial layer is grown on a silicon substrate through chemical vapor deposition. Next, a nitride layer is deposited over the epitaxial layer. Then specific areas of the nitride layer are exposed to radiation, and the exposed areas are etched away, leaving behind exposed areas on the epitaxial layer, (i.e., areas no longer covered by the nitride layer). The exposed areas then are subjected to a diffusion or ion implantation process, causing dopants, for example phosphorus, to enter the exposed epitaxial layer and form charged wells. This process of depositing layers of material on the substrate or subsequent material layers, and then exposing specific patterns to radiation, etching, and dopants or other diffusion materials, is repeated a number of times, allowing the different physical layers of the circuit to be manufactured.

Each time that a layer of material is exposed to radiation, a mask must be created to expose only the desired areas to the radiation, and to protect the other areas from exposure. The mask is created from circuit layout data. That is, the geometric elements described in a layout design define the relative locations or areas of the circuit that will be exposed to radiation through the mask. A mask or reticle writing tool is used to create the mask based upon the layout design, after which the mask can be used in a photolithographic process.

As designers and manufacturers continue to increase the number of circuit components in a given area and/or shrink the size of circuit components, the shapes reproduced on the substrate (and thus the shapes in the mask) become smaller and are placed closer together. This reduction in feature size increases the difficulty of faithfully reproducing the image intended by the layout design onto the substrate. The diffractive effects of light often result in defects where the intended image is not accurately "printed" onto the substrate during the photolithographic process, creating flaws in the manufactured device. One or more resolution enhancement techniques (RETs) are often employed to improve the resolution of the image that the mask forms on the substrate during the photolithographic process. Examples of various resolution enhancement techniques are discussed in "Resolution Enhancement Technology: The Past, the Present, and Extensions for the Future," Frank M. Schellenberg, Optical Microlithography XVII, edited by Bruce W. Smith, Proceedings of SPIE Vol. 5377, which article is incorporated entirely herein by reference.

One of these techniques, "optical proximity correction" or "optical process correction"(OPC), adjusts the amplitude of the light transmitted through a lithographic mask by modifying the layout design data employed to create the mask. For example, edges in the layout design may be adjusted to make certain portions of the geometric elements larger or smaller, in accordance with how much additional light exposure (or lack of exposure) is desired at certain points on the substrate. When these adjustments are appropriately calibrated, overall pattern fidelity is greatly improved.

Figure 5:
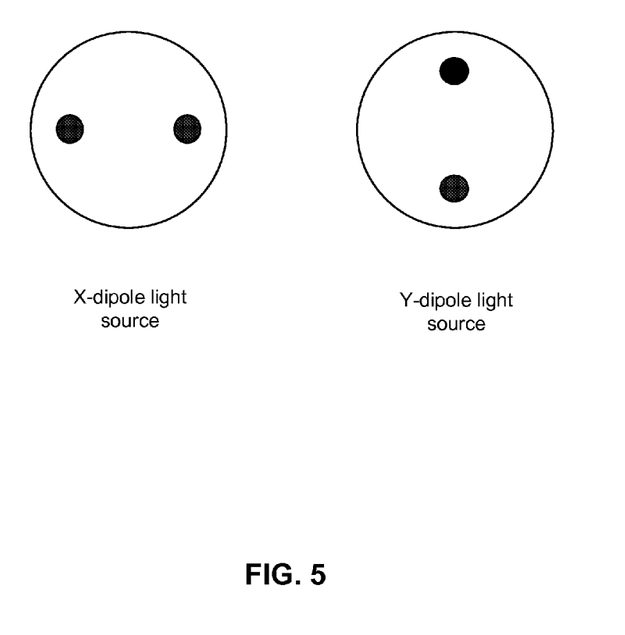
FIG. 5 illustrates two orthogonal dipole light sources.

Off-axis illumination (OAI) is another widely used RET, taking advantage of the relationship between image resolution and the propagation direction of the light transmitted through a lithographic mask. OAI improves the image resolution by shifting diffraction orders such that higher order diffraction beams can be collected by the collection pupil of the objective lens. A particular oblique illumination direction improves resolution of only those features that are correctly oriented with respect to that illumination direction, however. Consequently, different layout features may require different OAI light sources. A category of OAI light sources is dipole light sources. Examples of two such dipole light sources are illustrated in FIG. 5. Dipole illumination increases image resolution of layout features that are oriented perpendicular to the axis of the dipole, but results in a significantly degraded image contrast for layout features that are parallel to the axis of the dipole.

A double exposure technique known as double dipole lithography (DDL) has been developed to utilize the benefits of dipole illumination and at the same time to reduce the degrading effects. In DDL, the layout design data are decomposed into two layout portions, corresponding to two dipole light sources with orthogonal dipole orientations. The two layout portions are then used to fabricate two masks. To simplify the description, an X dipole light source 501 and a Y dipole light source 503 are used here to denote the two light sources with orthogonal dipole orientations, as illustrated in FIG. 5. The two layout design portions are labeled as a vertical layout portion and a horizontal layout portion. The mask made with the vertical layout portion is exposed by the X dipole light source and the second mask made with the horizontal layout portion is exposed by the Y dipole light source. Accordingly, DDL uses two masks and two exposures followed by a single etch to print one layer of layout features onto a substrate. It should be appreciated that the two pairs of words, "X/Y" and "vertical/horizontal" are used to describe orientations relative to each other, not specific orientations.

The layout decomposition for DDL is not as straightforward as it appears to be. Many features may not be classified as either horizontal or vertical layout features. It is particularly true for low aspect ratio features such as small jog, line-ends, and landing pads. Effects of neighboring features may also need to be considered. Thus, the layout decomposition remains a challenge in DDL.

BRIEF SUMMARY OF THE INVENTION

Aspects of the invention relate to decomposing layout design data based on partial intensity distribution information. The partial intensity distribution information may be generated by performing one optical simulation on the layout design data with an X dipole light source and another optical simulation with a Y dipole light source. In some embodiments of the invention, image contrast data, derived from the partial intensity distribution, may be used for the layout decomposition. In some other embodiments of the invention, image slope values, such as normalized image log slope (NILS) data derived from the partial intensity distribution information, may be used alone or in connection with the image contrast data for the layout decomposition. User-provided information, geometric information or any combinations of these may be employed to assist the layout decomposition. The layout decomposition may assign a layout pattern or a fragment of a layout pattern (both referred to as a feature hereafter) to either a horizontal layout portion or a vertical layout portion or both. A feature belonging to the first two categories is referred to as a single-exposure feature while a feature belonging to the third category is denoted as a double-exposure feature.

The layout decomposition may be adjusted during an OPC process. A single-exposure feature may be changed to a double-exposure feature, or vice versa, based on effects of the OPC process. For example, if an OPC correction to a single-exposure feature is so large that the feature may not be printed well, the feature may be changed to a double-exposure feature. In another example, a feature may be changed from double-exposure to single-exposure if a process-window simulation predicts a risk of bridging between the feature and a neighboring feature. The partial intensity distribution information may be used to assist the decomposition adjustment. In some embodiments of the invention, features are grouped into a plurality of categories based on the partial intensity information. The decomposition adjustment treats features belonging to different categories differently.

BRIEF DESCRIPTION OF THE DRAWINGS

FIG. 8a illustrates layout decomposition.

DETAILED DESCRIPTION OF THE INVENTION

Various aspects of the present invention relate to using partial intensity information to decompose layout design data into two portions for DDL. In the following description, numerous details are set forth for the purpose of explanation.

However, one of ordinary skill in the art will realize that the invention may be practiced without the use of these specific details. In other instances, well-known features have not been described in details to avoid obscuring the present invention.

Some of the techniques described herein can be implemented in software instructions stored on a computer-readable medium, software instructions executed on a computer, or some combination of both. Some of the disclosed techniques, for example, can be implemented as part of an electronic design automation (EDA) tool. Such methods can be executed on a single computer or on networked computers.

Although the operations of the disclosed methods are described in a particular sequential order for convenient presentation, it should be understood that this manner of description encompasses rearrangements, unless a particular ordering is required by specific language set forth below. For example, operations described sequentially may in some cases be rearranged or performed concurrently. Moreover, for the sake of simplicity, the disclosed flow charts and block diagrams typically do not show the various ways in which particular methods can be used in conjunction with other methods. Additionally, the detailed description sometimes uses terms like "generate" and "decompose" to describe the disclosed methods. Such terms are high-level abstractions of the actual operations that are performed. The actual operations that correspond to these terms will vary depending on the particular implementation and are readily discernible by one of ordinary skill in the art.

Also, as used herein, the term "design" is intended to encompass data describing an entire integrated circuit device. This term also is intended to encompass a smaller group of data describing one or more components of an entire device, however, such as a portion of an integrated circuit device. Still further, the term "design" also is intended to encompass data describing more than one microdevice, such as data to be used to form multiple microdevices on a single wafer.

Operating Environment

The execution of various electronic design automation processes may be implemented using computer-executable software instructions executed by one or more programmable computing devices. Because these examples of the invention may be implemented using software instructions, the components and operation of a generic programmable computer system on which various embodiments of the invention may be employed will first be described. Further, because of the complexity of some electronic design automation processes and the large size of many circuit designs, various electronic design automation tools are configured to operate on a computing system capable of simultaneously running multiple processing threads. The components and operation of a computer network having a host or master computer and one or more remote or slave computers therefore will be described with reference to FIG. 1. This operating environment is only one example of a suitable operating environment, however, and is not intended to suggest any limitation as to the scope of use or functionality of the invention.

Figure 1:
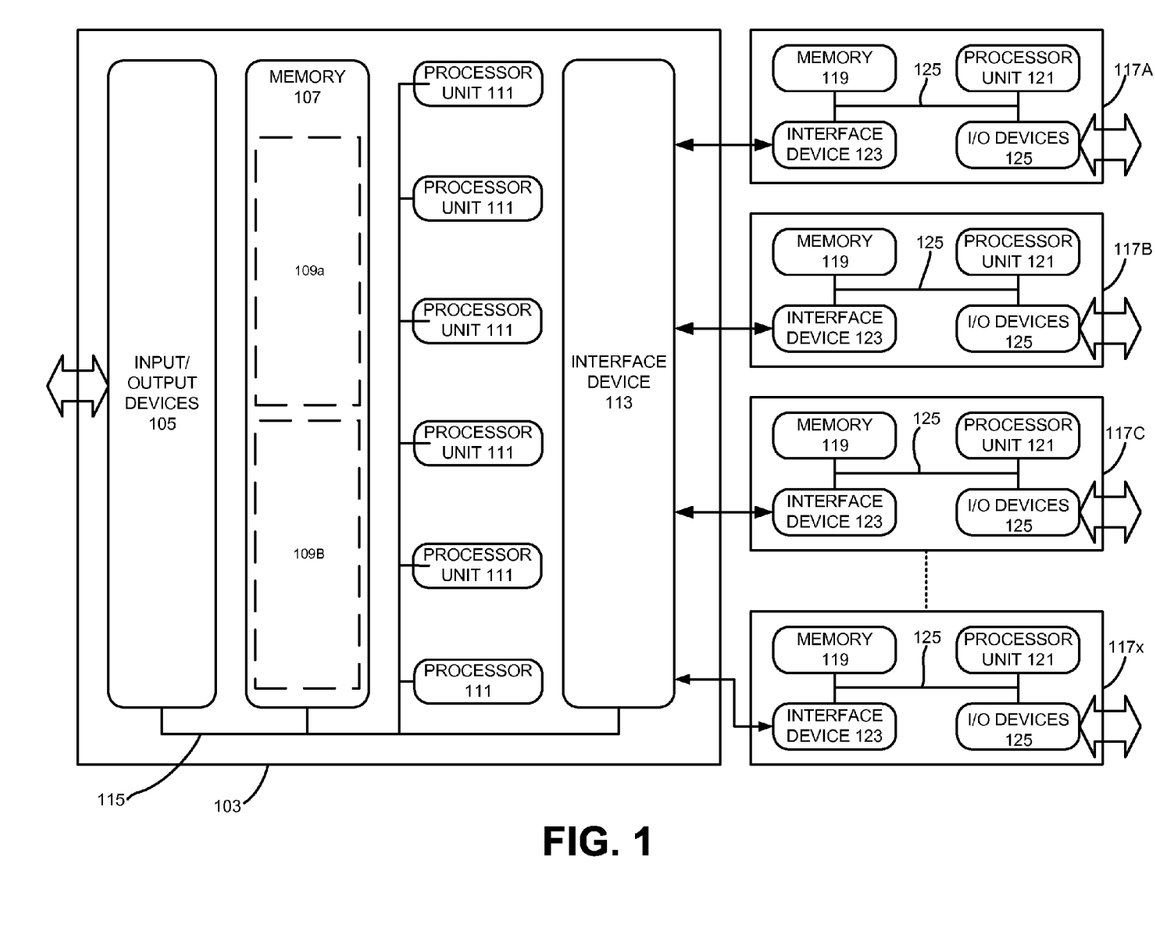
FIG. 1 illustrates an example of a computing system that may be used to implement various embodiments of the invention.

In FIG. 1, the computer network 101 includes a master computer 103. In the illustrated example, the master computer 103 is a multi-processor computer that includes a plurality of input and output devices 105 and a memory 107. The input and output devices 105 may include any device for receiving input data from or providing output data to a user. The input devices may include, for example, a keyboard, microphone, scanner or pointing device for receiving input from a user. The output devices may then include a display monitor, speaker, printer or tactile feedback device. These devices and their connections are well known in the art, and thus will not be discussed at length here.

The memory 107 may similarly be implemented using any combination of computer readable media that can be accessed by the master computer 103. The computer readable media may include, for example, microcircuit memory devices such as read-write memory (RAM), read-only memory (ROM), electronically erasable and programmable read-only memory (EEPROM) or flash memory microcircuit devices, CD-ROM disks, digital video disks (DVD), or other optical storage devices. The computer readable media may also include magnetic cassettes, magnetic tapes, magnetic disks or other magnetic storage devices, punched media, holographic storage devices, or any other medium that can be used to store desired information.

As will be discussed in detail below, the master computer 103 runs a software application for performing one or more operations according to various examples of the invention. Accordingly, the memory 107 stores software instructions 109A that, when executed, will implement a software application for performing one or more operations. The memory 107 also stores data 109B to be used with the software application. In the illustrated embodiment, the data 109B contains process data that the software application uses to perform the operations, at least some of which may be parallel.

The master computer 103 also includes a plurality of processor units 111 and an interface device 113. The processor units 111 may be any type of processor device that can be programmed to execute the software instructions 109A, but will conventionally be a microprocessor device. For example, one or more of the processor units 111 may be a commercially generic programmable microprocessor, such as Intel® Pentium® or Xeon™ microprocessors, Advanced Micro Devices Athlon™ microprocessors or Motorola 68K/Coldfire® microprocessors. Alternately or additionally, one or more of the processor units 111 may be a custom-manufactured processor, such as a microprocessor designed to optimally perform specific types of mathematical operations. The interface device 113, the processor units 111, the memory 107 and the input/output devices 105 are connected together by a bus 115.

Figure 2:
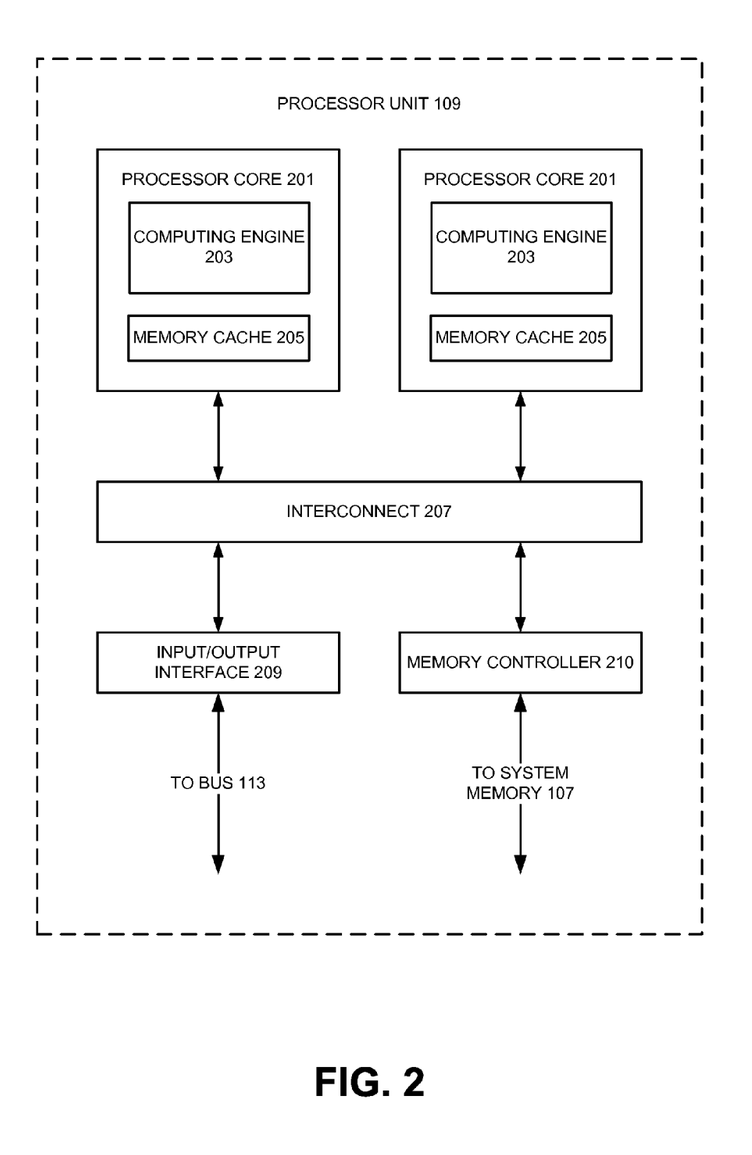
FIG. 2 illustrates an example of a multi-core processor unit that may be used to implement various embodiments of the invention.

With some implementations of the invention, the master computing device 103 may employ one or more processing units 111 having more than one processor core. Accordingly, FIG. 2 illustrates an example of a multi-core processor unit 111 that may be employed with various embodiments of the invention. As seen in this figure, the processor unit 111 includes a plurality of processor cores 201. Each processor core 201 includes a computing engine 203 and a memory cache 205. As known to those of ordinary skill in the art, a computing engine contains logic devices for performing various computing functions, such as fetching software instructions and then performing the actions specified in the fetched instructions. These actions may include, for example, adding, subtracting, multiplying, and comparing numbers, performing logical operations such as AND, OR, NOR and XOR, and retrieving data. Each computing engine 203 may then use its corresponding memory cache 205 to quickly store and retrieve data and/or instructions for execution.

Each processor core 201 is connected to an interconnect 207. The particular construction of the interconnect 207 may vary depending upon the architecture of the processor unit 201. With some processor cores 201, such as the Cell microprocessor created by Sony Corporation, Toshiba Corporation and IBM Corporation, the interconnect 207 may be implemented as an interconnect bus. With other processor units 201, however, such as the Opteron™ and Athlon™ dual-core processors available from Advanced Micro Devices of Sunnyvale, Calif., the interconnect 207 may be implemented as a system request interface device. In any case, the processor cores 201 communicate through the interconnect 207 with an input/output interfaces 209 and a memory controller 211. The input/output interface 209 provides a communication interface between the processor unit 201 and the bus 115. Similarly, the memory controller 211 controls the exchange of information between the processor unit 201 and the system memory 107. With some implementations of the invention, the processor units 201 may include additional components, such as a high-level cache memory accessible shared by the processor cores 201.

While FIG. 2 shows one illustration of a processor unit 201 that may be employed by some embodiments of the invention, it should be appreciated that this illustration is representative only, and is not intended to be limiting. For example, some embodiments of the invention may employ a master computer 103 with one or more Cell processors. The Cell processor employs multiple input/output interfaces 209 and multiple memory controllers 211. Also, the Cell processor has nine different processor cores 201 of different types. More particularly, it has six or more synergistic processor elements (SPEs) and a power processor element (PPE). Each synergistic processor element has a vector-type computing engine 203 with 128×128 bit registers, four single-precision floating point computational units, four integer computational units, and a 256 KB local store memory that stores both instructions and data. The power processor element then controls that tasks performed by the synergistic processor elements. Because of its configuration, the Cell processor can perform some mathematical operations, such as the calculation of fast Fourier transforms (FFTs), at substantially higher speeds than many conventional processors.

It also should be appreciated that, with some implementations, a multi-core processor unit 111 can be used in lieu of multiple, separate processor units 111. For example, rather than employing six separate processor units 111, an alternate implementation of the invention may employ a single processor unit 111 having six cores, two multi-core processor units each having three cores, a multi-core processor unit 111 with four cores together with two separate single-core processor units 111, etc.

Returning now to FIG. 1, the interface device 113 allows the master computer 103 to communicate with the slave computers 117A, 1157, 117C . . . 117x through a communication interface. The communication interface may be any suitable type of interface including, for example, a conventional wired network connection or an optically transmissive wired network connection. The communication interface may also be a wireless connection, such as a wireless optical connection, a radio frequency connection, an infrared connection, or even an acoustic connection. The interface device 113 translates data and control signals from the master computer 103 and each of the slave computers 117 into network messages according to one or more communication protocols, such as the transmission control protocol (TCP), the user datagram protocol (UDP), and the Internet protocol (IP). These and other conventional communication protocols are well known in the art, and thus will not be discussed here in more detail.

Each slave computer 117 may include a memory 119, a processor unit 121, an interface device 122, and, optionally, one more input/output devices 125 connected together by a system bus 127. As with the master computer 103, the optional input/output devices 125 for the slave computers 117 may include any conventional input or output devices, such as keyboards, pointing devices, microphones, display monitors, speakers, and printers. Similarly, the processor units 121 may be any type of conventional or custom-manufactured programmable processor device. For example, one or more of the processor units 121 may be commercially generic programmable microprocessors, such as Intel® Pentium® or Xeon™ microprocessors, Advanced Micro Devices Athlon™ microprocessors or Motorola 68K/Coldfire® microprocessors. Alternately, one or more of the processor units 121 may be custom-manufactured processors, such as microprocessors designed to optimally perform specific types of mathematical operations. Still further, one or more of the processor units 121 may have more than one core, as described with reference to FIG. 2 above. For example, with some implementations of the invention, one or more of the processor units 121 may be a Cell processor. The memory 119 then may be implemented using any combination of the computer readable media discussed above. Like the interface device 113, the interface devices 123 allow the slave computers 117 to communicate with the master computer 103 over the communication interface.

In the illustrated example, the master computer 103 is a multi-processor unit computer with multiple processor units 111, while each slave computer 117 has a single processor unit 121. It should be noted, however, that alternate implementations of the invention may employ a master computer having single processor unit 111. Further, one or more of the slave computers 117 may have multiple processor units 121, depending upon their intended use, as previously discussed. Also, while only a single interface device 113 or 123 is illustrated for both the master computer 103 and the slave computers, it should be noted that, with alternate embodiments of the invention, either the computer 103, one or more of the slave computers 117, or some combination of both may use two or more different interface devices 113 or 123 for communicating over multiple communication interfaces.

With various examples of the invention, the master computer 103 may be connected to one or more external data storage devices. These external data storage devices may be implemented using any combination of computer readable media that can be accessed by the master computer 103. The computer readable media may include, for example, microcircuit memory devices such as read-write memory (RAM), read-only memory (ROM), electronically erasable and programmable read-only memory (EEPROM) or flash memory microcircuit devices, CD-ROM disks, digital video disks (DVD), or other optical storage devices. The computer readable media may also include magnetic cassettes, magnetic tapes, magnetic disks or other magnetic storage devices, punched media, holographic storage devices, or any other medium that can be used to store desired information. According to some implementations of the invention, one or more of the slave computers 117 may alternately or additions be connected to one or more external data storage devices. Typically, these external data storage devices will include data storage devices that also are connected to the master computer 103, but they also may be different from any data storage devices accessible by the master computer 103.

It also should be appreciated that the description of the computer network illustrated in FIG. 1 and FIG. 2 is provided as an example only, and it not intended to suggest any limitation as to the scope of use or functionality of alternate embodiments of the invention.

Layout Decomposition Tool

Figure 3:
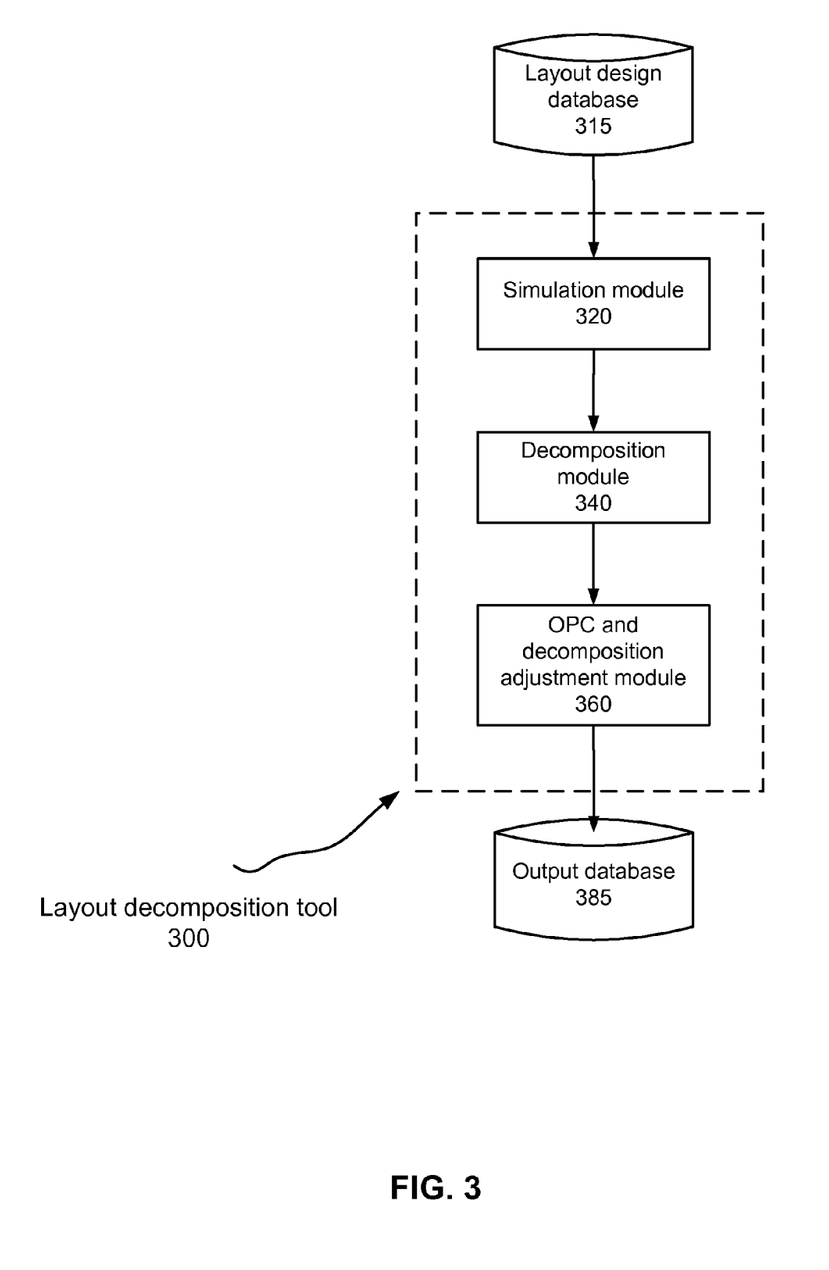
FIG. 3 illustrates an example of a layout decomposition tool.

FIG. 3 illustrates an example of a layout decomposition tool 300 that may be implemented according to various embodiments of the invention. As seen in the figure, the layout decomposition tool 300 includes a simulation module 320, a decomposition module 340, and an OPC and decomposition adjustment module 360. As also shown in this figure, various implementations of the layout decomposition tool 300 may cooperate with (or incorporate, in whole or part) a layout design database 315 and an output database 385.

As will be discussed in detail below, the layout decomposition tool 300 decomposes layout design data into a horizontal layout portion and a vertical layout portion based on partial intensity distribution information. The simulation module 320 receives the layout design data from the layout design database 315 and performs optical simulations on the layout design data to obtain the partial intensity distribution information. An X-dipole light source and a Y-dipole light source are simulated separately for the simulations.

Next, the decomposition module 340 analyzes the partial intensity distribution information to assign features in the layout design data to either the horizontal layout portion or the vertical layout portion or both. As discussed earlier, the term "feature" may refer to a whole layout pattern (e.g. a polygon) or a fragment of a layout pattern (e.g. a portion of a polygon). The decomposition module 340 may use image contrast data derived from the partial intensity distribution information for the assignment. The decomposition module 340 may also use image slope values derived from the partial intensity distribution information for the assignment. Users may alternatively or additionally provide instructions to guide the assignment. Geometric information of a feature may also be considered by the decomposition module 340. It should be appreciated that the decomposition module 340 may decide the assignment of a feature based on the partial intensity distribution information not only for the feature but also for its neighboring features.

After the initial decomposition performed by the decomposition module 340, the OPC and decomposition adjustment module 360 performs OPC on the horizontal layout portion and the vertical layout portion and may adjust the initial decomposition. During decomposition adjustment, single-exposure features may be changed to double-exposure features and double-exposure features may be changed to single-exposure features, based on the effects of the OPC. The partial intensity distribution information may also play a role in the decomposition adjustment. For example, the OPC and decomposition adjustment module 360 may treat features differently based on the partial intensity distribution information. It should be noted that the OPC and decomposition adjustment process may be performed more than one time or iteratively on a feature.

As previously noted, various embodiments of the invention may be embodied by a computing system, such as the computing system illustrated in FIG. 1 and FIG. 2. Accordingly, one or more components of each of the simulation module 320, the decomposition module 340, and the OPC and decomposition adjustment module 360 may be implemented using one or more processors in a computing system. It should be appreciated that, while these three modules are shown as separate units in FIG. 3, a single computer (or a single processor in a computing system) may be used to implement two or more of these modules at different times. Also, various examples of the invention may be embodied by software-executable instructions, stored on a computer-readable medium, for instructing a computing system to implement one or more components of each of the simulation module 320, the decomposition module 340, and the OPC and decomposition adjustment module 360. Further, while the layout design database 315 and the output database 385 are shown as separate units in FIG. 3, a single computer accessible medium may be used to implement two or all three of these databases. Still further, each module may either be fully automated or allow a user to provide instructions for an operation.

Layout Decomposition

Figure 4:
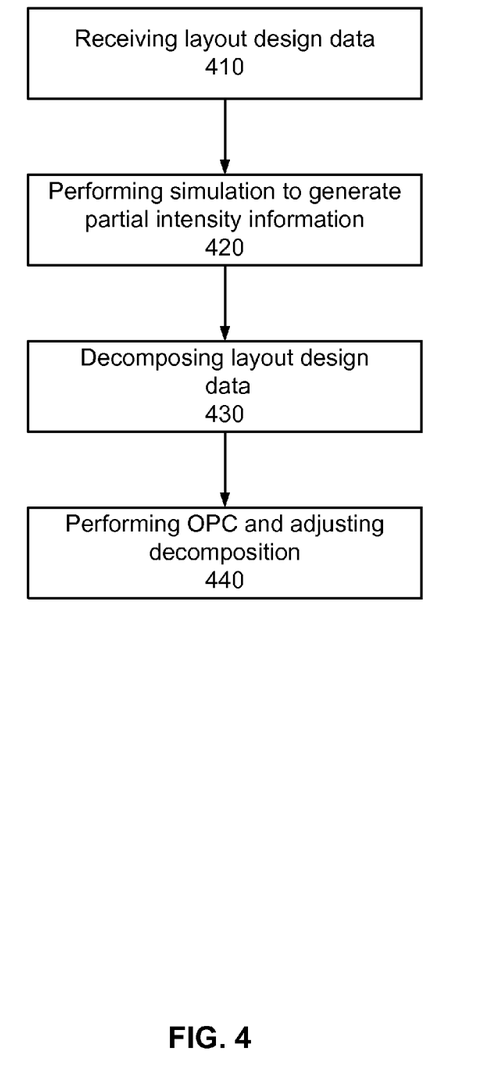
FIG. 4 illustrates a flowchart describing methods of decomposing layout design data based on partial intensity distribution information according to various embodiments of the invention.

FIG. 4 illustrates a flowchart describing methods of layout decomposition according to various embodiments of the invention. For purposes of explanation, various methods encompassed in FIG. 4 will be described with reference to the layout decomposition tool 300 shown in FIG. 3. It should be appreciated that the operations illustrated in FIG. 4 may be employed by implementations of a different layout decomposition tool, according to various embodiments of the invention. Likewise, it should be appreciated that the layout decomposition tool 300 shown in FIG. 3 may be used to perform methods according to various embodiments of the invention different from those encompassed by the flowchart of FIG. 4.

Also, it should be appreciated that various embodiments of the invention may be implemented by a system comprising one or more processors programmed to perform the operations described in FIG. 4. Still further, various embodiments of the invention may be implemented by processor-executable instructions, stored in a processor-readable medium, for causing one or more processors to perform the operations described in FIG. 4.

The flow illustrated in FIG. 4 starts with operation 410, receiving layout design data by the layout decomposition tool 300. As discussed in the background section, DDL uses two masks and two exposures followed by a single etch to print one layer of layout features described by the layout design data onto a substrate. Accordingly, the layout design data need to be decomposed into a horizontal layout portion and a vertical layout portion for fabricating the two masks. In various embodiments of the invention, partial intensity distribution information is applied to decompose the layout design data. To generate the partial intensity distribution information, the simulation module 320 performs, in operation 420, two optical simulations on the layout design data using two dipole light sources, an X dipole light source and a Y dipole light source, separately. An example of the two dipole light sources is shown in FIG. 5. The optical simulations simulate two exposures in DDL. Unlike the two exposures in DDL using two different masks, however, the simulations are performed on the unified layout design data which have yet been decomposed. For each dipole light source, partial intensity distribution information is obtained. The term "partial intensity" reflects the fact that printing a layer of layout features requires two light exposures. It does not mean that illumination from both the dipole light sources are needed for printing each feature onto the substrate. As discussed in detail below, some features printed on the substrate may be formed mainly by illumination with one dipole light source (single-exposure features) while others may require two exposures (double exposure features). Many existing tools may be adopted by the simulation module 320 for the operation 420, such as the optical simulation tools included in the CALIBRE family of software tools available from Mentor Graphics Corporation, Wilsonville, Oreg.

In operation 430, the decomposition module 340 analyzes the partial intensity distribution information generated by the operation 420 and decomposes the layout design data into two layout portions. With some implementations of the invention, image contrast information (contrast data) is derived from the partial intensity distribution information and is used for assigning a feature to either the horizontal layout portion or the vertical layout portion or both. As already discussed, when a feature is assigned to only one of the layout portions, it is called a single-exposure feature; when a feature is assigned to both of the layout portions, it is called a double-exposure feature. There are two sets of contrast data for each feature in the layout design data, one set for illumination by the X-dipole light source and the other for illumination by the Y-dipole light source. These two sets of data are compared by the decomposition module 340. If a feature has a contrast higher for one light source than for the other, it may be assigned as a single-exposure feature. For example, a feature with higher contrast data for the X-dipole light source may be assigned to the vertical layout portion only. If the contrasts of a feature for the two light sources are comparable, it may be assigned as a double-exposure feature. The assignment of the feature may also need to consider the feature's environment, or its neighboring features.

Figure 6A:
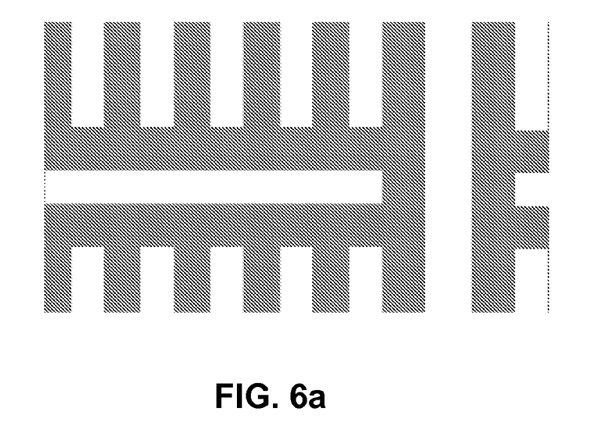
FIG. 6a shows a section of a layout design target (in grey color) before decomposition.
Figure 6B:
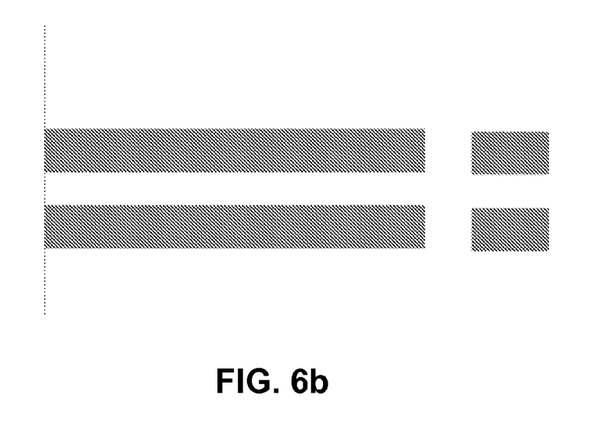
FIG. 6b the horizontal layout portion.
Figure 6C:
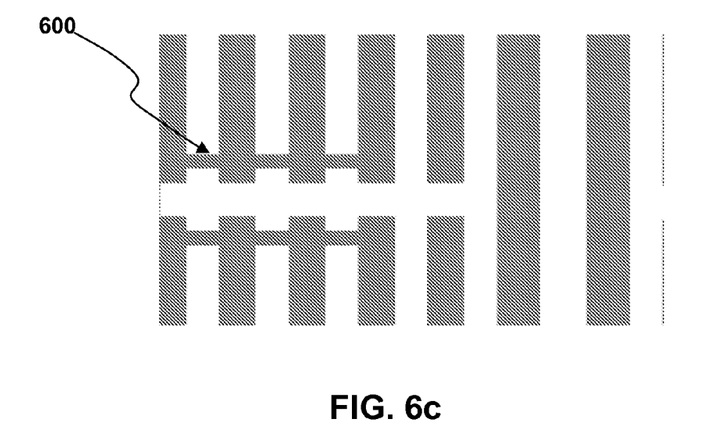
FIG. 6c shows the vertical layout portion.

FIG. 6a shows a section of a layout design target before decomposition. FIG. 6b shows features in the horizontal layout portion after the decomposition which is associated with the Y-dipole light source, while FIG. 6c shows features in the vertical layout portion after the decomposition which is associated with the X-dipole light source. Apparently from the figures, vertical features are found mainly in the vertical layout portion and horizontal features are found mainly in the horizontal layout portion. Some horizontal features, however, are also found in the vertical layout portion such as feature 600 in FIG. 6c. The decomposition module 340 may assign them as double-exposure features after determining that the contrast values for the two light sources are comparable in the region of these features. This assignment may be counter-intuitive since these features including feature 600 are parts of long horizontal lines and could not be derived based on simple rules.

With some implementations of the invention, a threshold value for contrast differences between the X-dipole light source and the Y-dipole light source may be used to help assign features to single-exposure features or double-exposure features. For example, if contrast differences for a feature are above the threshold, the feature may be assigned to either the horizontal layout portion or the vertical layout portion depending on which dipole light source produce the higher contrast. This threshold value could be derived from experience or prior decomposition attempts—the decomposition process may be iterative. In some embodiments of the invention, absolute intensity values may also be considered for features with the contrast differences slightly above the threshold. This is because, for example, some features may require double exposure to achieve adequate light exposure even though they favor either X- or the Y-dipole illumination. A feature's geometric information or some rule-based methods may be used to assist the decomposition as well. For example, the vertical array features in FIG. 6a may be assigned quickly to the vertical layout portion mainly based on their regular array structure and neighboring features.

In various embodiments of the invention, image slope information such as NILS may be used as a basis for the layout decomposition alternatively or additionally. NILS measures the steepness of the image in transition from bright to dark and may serve as a metric of image quality. Like the contrast data, the NILS values of a feature can be derived from the partial intensity distribution information. Based on the NILS values associated with the two dipole light sources, features may be assigned to one or two of the layout portions. Again, the NILS values of the feature's neighbors may also play a role in the assignment.

Figure 7A:
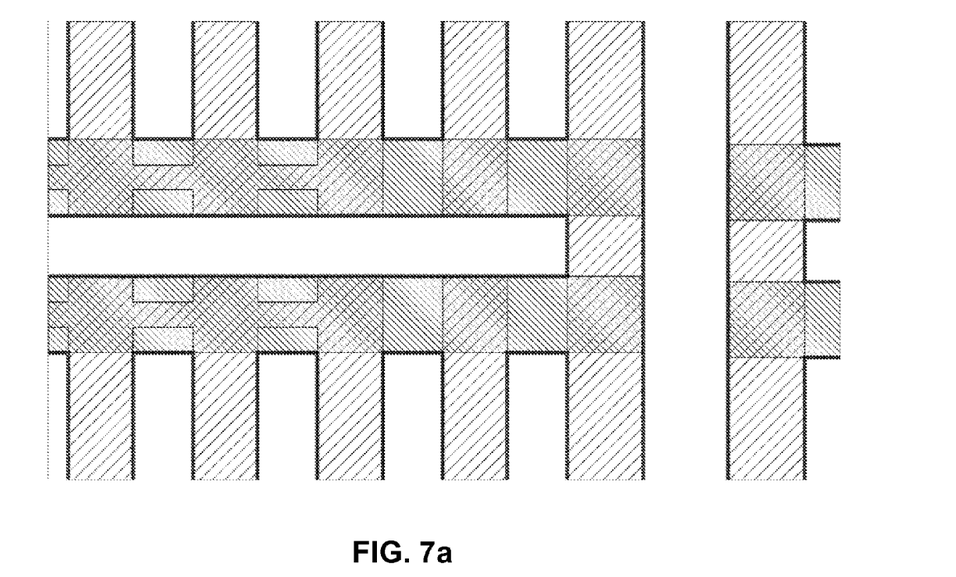
FIG. 7a illustrates layout decomposition and FIG. 7b illustrates OPC (the thick lines represent the edges of the target polygons; areas having parallel diagonal lines with a wide spacing represent the vertical layout portion and areas having parallel diagonal lines with a narrow spacing represent the horizontal layout portion).
Figure 7B:
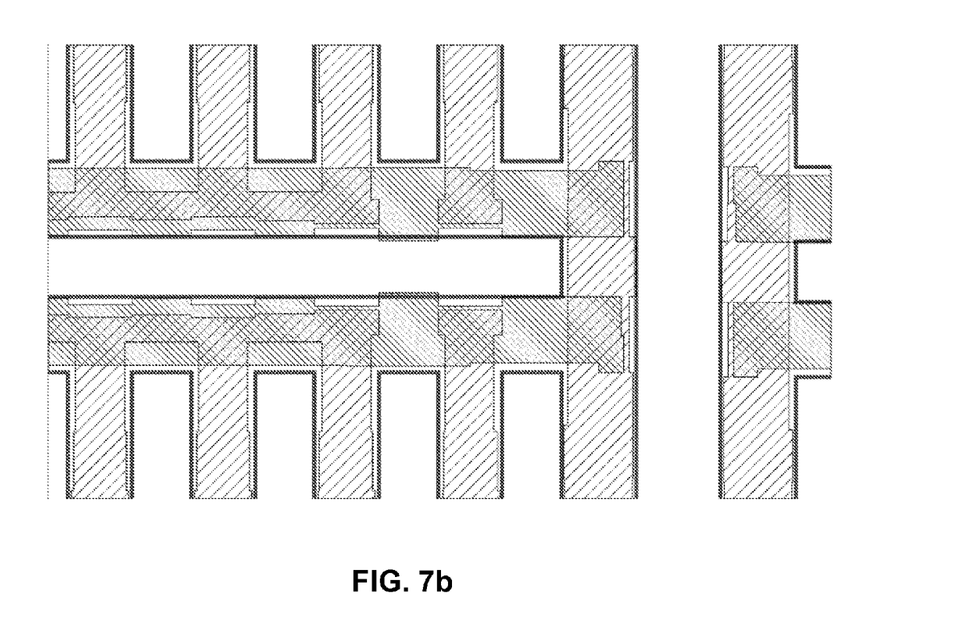

In operation 440, the OPC and decomposition adjustment module 360 may, based on OPC effects, adjust the initial layout decomposition obtained in operation 430. The module 360 performs OPC on one or both of the layout portions to compensate errors due to diffraction or process effects. OPC corrects these errors by moving edges or adding extra polygons to the pattern written on the mask, as illustrated in FIG. 7a and FIG. 7b. These two figures show features before and after OPC, respectively (The thick lines represent the edges of the target polygons and features from the vertical and horizontal layout portions are superimposed on each other). Changes to features due to OPC can be seen in both the horizontal and vertical layout portions. In some cases, the changes may lead to decomposition adjustment. For example, if a correction made by OPC is so large that a single-exposure feature would not be printed well, the module 360 may change the feature to be a double-exposure feature. In another example, if process-window simulations show a risk of bridging between a double-exposure feature and its neighboring features, the feature may be changed to a single-exposure feature.

Figure 8A:
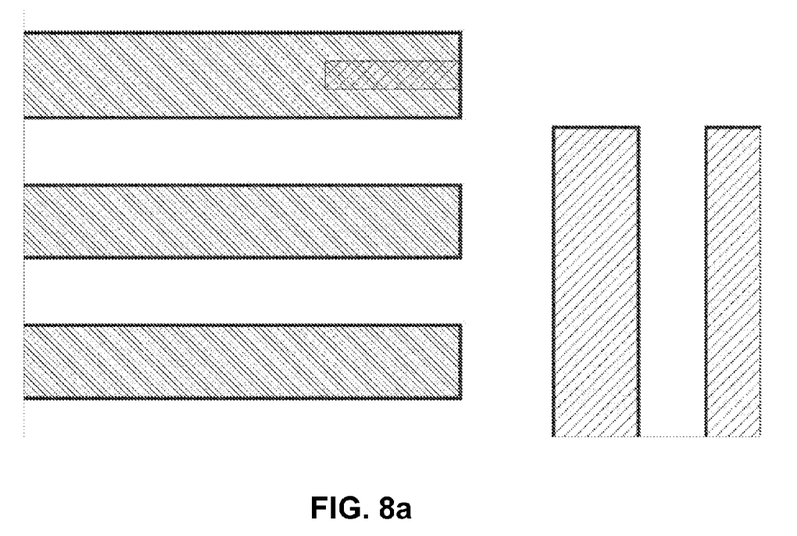
Figure 8B:
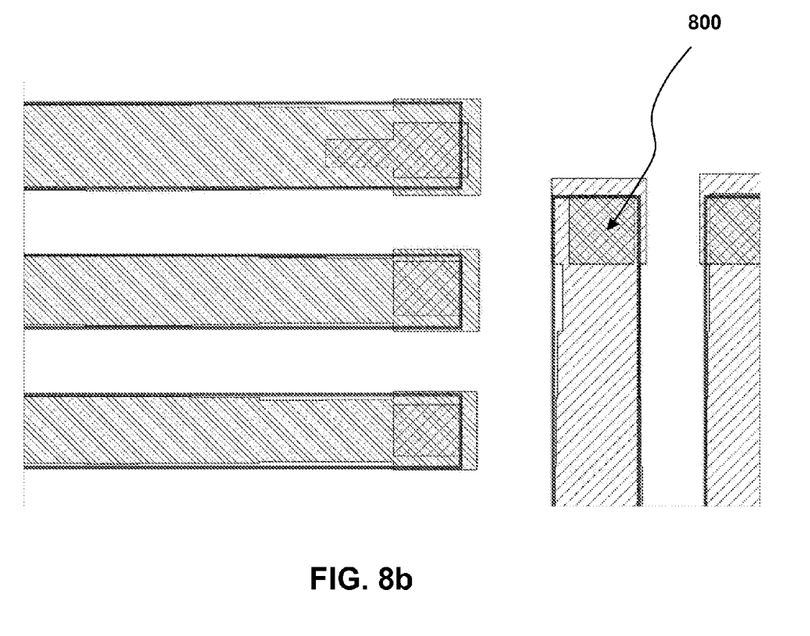
FIG. 8b illustrates OPC and decomposition adjustment (the thick lines represent the edges of the target polygons; areas having parallel diagonal lines with a wide spacing represent the vertical layout portion and areas having parallel diagonal lines with a narrow spacing represent the horizontal layout portion).

The partial intensity distribution information may be applied to assist in adjusting layout decomposition during the operation 440. With various implementations of the invention, features may be grouped into a plurality of categories, e.g. dipole-strong, dipole-weak, and dipole-neutral categories. Features in the dipole-strong category have strong sensitivity to the dipole illumination such as features forming a repeated "diffraction grating" pattern. These dipole-strong features are often single-exposure features and should have a strong resistance against being changed to double-exposure features. Features having a small square shape usually belong to the dipole neutral category and should have a strong resistance against being changed from double-exposure features to single-exposure features. Users' instructions may also be considered by the OPC and decomposition adjustment module 360. FIG. 8 illustrates another example of OPC and decomposition adjustment. In this example, some features such as feature 800 are changed by the module 360 from single-exposure features to double-exposure features after OPC.

CONCLUSION

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

What is claimed is:

1. A method of layout decomposition, comprising:
   receiving layout design data;
   generating first intensity information by performing an optical simulation on the layout design data with a light source having a dipole oriented in a first direction;
   generating second intensity information by performing an optical simulation on the layout design data with a light source having a dipole orientated in a second direction, the second direction being perpendicular to the first direction; and
   decomposing, using a computer, the layout design data into a first layout portion and a second layout portion based on one or both of the first intensity information and the second intensity information, the first layout portion being associated with the light source having the dipole oriented in the first direction and the second layout portion being associated with the light source having the dipole oriented in the second direction.

2. The method recited in claim 1, wherein decomposing the layout design data is further based on additional information.

3. The method recited in claim 2, wherein the additional information is user-provided.

4. The method recited in claim 2, wherein the additional information is geometric information.

5. The method recited in claim 1, further comprising:
performing OPC (optical proximity correction) on one or both of the first layout portion and the second layout, and adjusting layout decomposition based on whether one or more conditions for adjusting layout decomposition are met.

6. The method recited in claim 5, wherein one of the one or more conditions is that a correction made by the OPC would exceed a threshold value.

7. The method recited in claim 5, wherein one of the one or more conditions is that a process-window simulation predicts a risk of bridging between a feature and a neighboring feature.

8. The method recited in claim 5, wherein adjusting layout decomposition includes changing a feature in the layout design data from being a single-exposure feature to being a double-exposure feature or from being a double-exposure feature to being a single-exposure feature.

9. The method recited in claim 5, wherein adjusting layout decomposition is further based on one or both of the first intensity information and the second intensity information.

10. The method recited in claim 5, wherein adjusting layout decomposition is further based on information provided by a user.

11. The method recited in claim 1, further comprising:
grouping features in the layout design data into a plurality of categories based on one or both of the first intensity information and the second intensity information.

12. The method recited in claim 11, wherein the two or more categories include dipole-strong, dipole-weak, and dipole-neutral categories.

13. The method recited in claim 11, wherein adjusting layout decomposition is further based on which one of the two or more categories a feature data belongs to.

14. The method recited in claim 1, wherein the first intensity information and the second intensity information include partial intensity distribution information.

15. The method recited in claim 14, wherein the partial intensity distribution information includes image contrast information.

16. The method recited in claim 14, wherein the partial intensity distribution information includes image slope information.

17. A processor-readable device storing processor-executable instructions for causing one or more processors to perform a method of layout decomposition, the method comprising:
receiving layout design data;
generating first intensity information by performing an optical simulation on the layout design data with a light source having a dipole oriented in a first direction;
generating second intensity information by performing an optical simulation on the layout design data with a light source having a dipole orientated in a second direction, the second direction being perpendicular to the first direction; and
decomposing the layout design data into a first layout portion and a second layout portion based on one or both of the first intensity information and the second intensity information, the first layout portion being associated with the light source having the dipole oriented in the first direction and the second layout portion being associated with the light source having the dipole oriented in the second direction.

18. The processor-readable device recited in claim 17, wherein decomposing the layout design data is further based on additional information.

19. The processor-readable device recited in claim 17, wherein the method further comprising:
performing OPC (optical proximity correction) on one or both of the first layout portion and the second layout, and adjusting layout decomposition based on whether one or more conditions for adjusting layout decomposition are met.

20. The processor-readable device recited in claim 19, wherein adjusting layout decomposition is further based on one or both of the first intensity information and the second intensity information.

21. A system comprising one or more processors, the one or more processors programmed to perform a method of layout decomposition, the method comprising:
receiving layout design data;
generating first intensity information by performing an optical simulation on the layout design data with a light source having a dipole oriented in a first direction;
generating second intensity information by performing an optical simulation on the layout design data with a light source having a dipole orientated in a second direction, the second direction being perpendicular to the first direction; and
decomposing the layout design data into a first layout portion and a second layout portion based on one or both of the first intensity information and the second intensity information, the first layout portion being associated with the light source having the dipole oriented in the first direction and the second layout portion being associated with the light source having the dipole oriented in the second direction.

22. The system recited in claim 21, wherein decomposing the layout design data is further based on additional information.

23. The system recited in claim 21, wherein the method further comprising:
performing OPC (optical proximity correction) on one or both of the first layout portion and the second layout, and adjusting layout decomposition based on whether one or more conditions for adjusting layout decomposition are met.

24. The system recited in claim 23, wherein adjusting layout decomposition is further based on one or both of the first intensity information and the second intensity information.

* * * * *